(12) United States Patent
Heathcoat, Jr. et al.

(10) Patent No.: US 10,598,234 B2
(45) Date of Patent: Mar. 24, 2020

(54) MECHANICALLY RELEASED BRAKE FOR A MOWING MACHINE

(71) Applicant: Parker-Hannifin Corporation, Cleveland, OH (US)

(72) Inventors: David Mark Heathcoat, Jr., Greenville, TN (US); Thomas Kevin Castle, Morristown, TN (US); Kenneth Todd Gilbert, Bristol, TN (US); Jason Scot Richardson, Chuckey, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 15/698,741

(22) Filed: Sep. 8, 2017

(65) Prior Publication Data
US 2018/0073578 A1 Mar. 15, 2018

Related U.S. Application Data

(60) Provisional application No. 62/393,892, filed on Sep. 13, 2016.

(51) Int. Cl.
*F16D 49/10* (2006.01)
*F16D 65/06* (2006.01)
(Continued)

(52) U.S. Cl.
CPC .............. *F16D 49/10* (2013.01); *A01D 69/10* (2013.01); *F16D 65/065* (2013.01); *A01D 34/64* (2013.01);
(Continued)

(58) Field of Classification Search
CPC ............ A01D 2101/00; A01D 34/6812; A01D 69/10; A01D 34/64; F16D 67/02;
(Continued)

(56) References Cited

U.S. PATENT DOCUMENTS 1,503,933 A * 8/1924 Woodall .................. F16D 49/10
188/77 R
1,540,109 A * 6/1925 Devine ................... F16D 49/10
188/77 R
(Continued)

FOREIGN PATENT DOCUMENTS

JP      60034535 A * 2/1985 ............. F16D 49/10

OTHER PUBLICATIONS

Parker Hannifin Corporation, Hydraulic Pump Motor Division, Integrated Hydrostatic Transmissions HTE, HTJ and HTG Series, Oct. 2015.

(Continued)

*Primary Examiner* — Bradley T King
*Assistant Examiner* — Mahbubur Rashid
(74) *Attorney, Agent, or Firm* — Renner, Otto, Boisselle & Sklar, LLP

(57) ABSTRACT

A brake apparatus for restricting rotation of a rotatable member of a mowing machine, thereby controlling rotation of a wheel of the mowing machine, includes a brake member fixable on the rotatable member, and a gripping member for engaging and disengaging the brake member for restricting or permitting rotation of the rotatable member. A thrust link is coupled to the gripping member such that movement of the thrust link causes the gripping member to engage or disengage a radially outer surface of the brake member. For example, the gripping member may be biasedly engaged with at least a partial circumferential extent of the brake member such that actuation of the thrust link causes disengagement of the gripping member from the brake member.

20 Claims, 11 Drawing Sheets

(51) Int. Cl.
*A01D 69/10* (2006.01)
*F16D 121/16* (2012.01)
*F16D 125/68* (2012.01)
*A01D 34/64* (2006.01)
*A01D 101/00* (2006.01)

(52) U.S. Cl.
CPC ...... *A01D 2101/00* (2013.01); *F16D 2121/16* (2013.01); *F16D 2125/68* (2013.01)

(58) Field of Classification Search
CPC .............. F16D 2121/16; F16D 2125/68; F16D 65/065; F16D 49/10; D06F 37/40
USPC ...................................................... 188/77 W
See application file for complete search history.

(56) References Cited

U.S. PATENT DOCUMENTS

| | | | | |
|---|---|---|---|---|
| 1,633,919 | A * | 6/1927 | Berger | B66D 5/023 188/218 R |
| 1,752,377 | A * | 4/1930 | Glueck | F16D 49/10 188/249 |
| 1,870,146 | A * | 8/1932 | Sharpe | F16D 67/02 188/110 |
| 1,911,611 | A * | 5/1933 | Douglas | H01H 21/26 188/1.11 L |
| 2,229,013 | A * | 1/1941 | Hoffman | F16D 49/10 188/105 |
| 2,542,171 | A * | 2/1951 | Wilson | F16D 49/10 188/77 R |
| 2,638,185 | A * | 5/1953 | Carnagua | F16D 49/12 188/151 R |
| 2,638,194 | A * | 5/1953 | Gray | B60T 11/103 188/152 |
| 2,780,320 | A * | 2/1957 | Walter | F16D 49/10 188/77 R |
| 2,854,865 | A * | 10/1958 | Rodgers | A01D 34/6806 180/19.1 |
| 3,026,665 | A * | 3/1962 | Hoff | A01D 34/6812 188/77 R |
| 3,253,391 | A * | 5/1966 | Meldahl | A01D 34/6812 192/12 R |
| 3,375,907 | A | 4/1968 | Moyer | |
| 3,869,026 | A | 3/1975 | Williams | |
| 4,044,533 | A * | 8/1977 | Wick | A01D 34/6812 188/77 W |
| 4,148,173 | A * | 4/1979 | Hoff | A01D 34/6812 56/11.3 |
| 4,316,355 | A * | 2/1982 | Hoff | A01D 34/6812 56/11.3 |
| 5,146,735 | A * | 9/1992 | McDonner | A01D 34/6806 180/19.3 |
| 5,155,985 | A * | 10/1992 | Oshima | A01D 34/6806 56/10.8 |
| 5,343,678 | A * | 9/1994 | Stuart | A01D 34/6812 180/19.3 |
| 5,501,304 | A * | 3/1996 | Fini, Jr. | F16D 49/08 188/250 H |
| 5,722,515 | A * | 3/1998 | Wyse | B60T 11/04 188/22 |
| 6,098,385 | A * | 8/2000 | Turk | A01D 34/6806 56/11.1 |
| 6,155,033 | A * | 12/2000 | Wians | A01D 34/6806 56/11.1 |
| 6,776,251 | B2 * | 8/2004 | Landmann | B60R 25/02147 180/287 |
| 6,918,451 | B2 * | 7/2005 | Nagashima | F16D 49/08 173/221 |
| 7,003,935 | B2 * | 2/2006 | Nesheim | A01D 34/475 56/10.8 |
| 2002/0148114 | A1 * | 10/2002 | Ruebusch | F16H 3/083 29/888.01 |
| 2007/0062169 | A1 * | 3/2007 | Busboom | A01D 69/08 56/11.6 |
| 2010/0003872 | A1 * | 1/2010 | Jessen | B60F 3/0007 440/12.5 |
| 2011/0197419 | A1 * | 8/2011 | Melone | A01D 34/64 29/428 |
| 2014/0102066 | A1 * | 4/2014 | Crosby | A01D 69/10 56/14.7 |
| 2014/0262630 | A1 * | 9/2014 | Borshov | A01D 69/10 188/16 |
| 2016/0031319 | A1 * | 2/2016 | Brazier | F16H 57/025 180/348 |
| 2017/0027106 | A1 * | 2/2017 | Gilbert | F16D 63/006 |

OTHER PUBLICATIONS

Parker Hannifin Corporation, Hydraulic Pump Motor Division, Integrated Hydrostatic Transmissions, HTE/HTJ/HTG Series, Catalog No. HY13-1595-002/US, Oct. 2012.

* cited by examiner

MECHANICALLY RELEASED BRAKE FOR A MOWING MACHINE

RELATED APPLICATIONS

This application claims the benefit of U.S. Provisional Application No. 62/239,892 filed Sep. 13, 2016, which is incorporated herein by reference.

FIELD OF INVENTION

The present invention relates generally to transmissions, and more particularly to brake assemblies, also herein referred to as brake apparatuses, for transmissions used in vehicles, such as mowing machines.

BACKGROUND

Hydrostatic transmissions have many uses, including the propelling of vehicles, such as mowing machines. A typical hydrostatic transmission system includes a variable displacement hydraulic pump connected in a closed hydraulic circuit with a fixed or variable displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral.

For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is often connected through suitable gearing to the vehicle's wheels or tracks. In some vehicles, such as zero-turn-radius mowers, separate hydraulic pumps and motors are used to independently drive separate wheels of an axle.

To park the vehicle, a brake apparatus is typically provided in the transmission to restrict or prevent rotational motion of a rotatable member, such as the output shaft, connected to the wheels. In some brake assemblies, a hub or rotor is connected to the rotatable member and a friction member engages the hub to restrict motion through frictional brake torque. In other brake assemblies, a locking mechanism mechanically interferes with the hub to restrict or prevent movement and provide the required brake torque.

SUMMARY OF INVENTION

The present invention provides a brake apparatus for restricting movement of a rotatable member, such as of a motive device of a vehicle or a wheel of a vehicle. The brake apparatus affords one or more advantages over conventional brake apparatuses used in mowing machines.

A brake apparatus for restricting rotation of a rotatable member of a mowing machine, thereby controlling rotation of a wheel of the mowing machine, includes a brake member fixable on the rotatable member, and a gripping member for engaging and disengaging the brake member for restricting or permitting rotation of the rotatable member. A thrust link is coupled to the gripping member such that movement of the thrust link causes the gripping member to engage or disengage a radially outer surface of the brake member. For example, the gripping member may be biasedly engaged with at least a partial circumferential extent of the brake member such that actuation of the thrust link causes disengagement of the gripping member from the brake member.

According to a first aspect of the invention, the brake apparatus is characterized by a brake member fixable on the rotatable member, and a gripping member for engaging and disengaging the brake member for restricting or permitting rotation of the rotatable member. A thrust link is coupled to the gripping member such that movement of the thrust link causes the gripping member to engage or disengage a radially outer surface of the brake member.

According to a second aspect of the invention, the brake apparatus includes a brake member fixable on the rotatable member, and a gripping member disposed about an external surface of the brake member and biased into default engagement with the brake member to restrict rotation of the rotatable member. The gripping member is configured to be moved to a secondary position at least partially spaced from the brake member to allow rotation of the rotatable member.

According to a third aspect of the invention, the brake apparatus includes a brake member being operatively rotatable jointly with the rotatable member, such as an output shaft. Further included is a gripping member biasedly engaged with at least a partial circumferential extent of the brake member thereby controlling rotation of the output shaft, and a linkage assembly configured to convert an input force to the linkage assembly into a greater output force at the gripping member to disengage the gripping member.

Various embodiments of the first, second and/or third aspect may include one or more of the following features.

The gripping member may be biased into a normally engaged state causing the gripping member to engage the brake member.

The brake apparatus may further include an anti-rotation member fixable relative to the brake member and interlocking with the gripping member to restrict the gripping member from rotating with the brake member.

The anti-rotation member may be fixable relative to each of the brake member and the gripping member.

The gripping member may include outwardly extending ends, where the brake apparatus further includes a pivoting linkage coupled between the ends and to the thrust link, and where movement of the thrust link from a default position of the thrust link causes the pivoting linkage to pivot, thereby moving the opposing projections relative to one another.

The pivoting linkage may be a force amplifying linkage configured to convert an input force at the thrust link into a greater output force at the amplifying linkage moving the ends.

The pivoting linkage may be a three-pin linkage or a cam linkage.

The gripping member may include a single shoe circumscribing a majority of an outer circumferential extent of the brake member.

The gripping member may include opposing shoes disposed about the brake member, the shoes being linearly translatable towards and away from one another to effect engagement with and disengagement from the brake member.

The gripping member may include an elastic band disposed about the brake member, the elastic band being biased in a state of engagement with the brake member, and wherein movement of the thrust link from the default position of the thrust link effects disengagement of the elastic band from the brake member.

The gripping member may have on a surface engageable with the brake member one or more gripping elements configured to cause friction between the gripping member and the brake member.

The gripping member may include outwardly extending ends, and wherein the brake apparatus further includes a force amplifying linkage configured to convert an input force to the force amplifying linkage into a greater output force at the amplifying linkage moving the ends.

The brake apparatus may be in combination with a motive device having the rotatable member. According to only the third aspect, a mowing machine may have the motive device for controlling rotation of one or more wheels of the mowing machine.

The foregoing and other features of the invention are hereinafter described in greater detail with reference to the accompanying drawings.

BRIEF DESCRIPTION OF THE DRAWINGS

The annexed drawings, which are not necessarily to scale, show various aspects of the disclosure.

DETAILED DESCRIPTION

The principles of the present application have particular application to mowers, such as zero-turn-radius mowers, and thus will be described below chiefly in this context. It will of course be appreciated and also understood that the principles of the invention may be useful in other vehicles, such as vehicles utilizing mechanical, hydrostatic, hydraulic, or electric drive systems, or with any equipment requiring restriction of rotation of a component.

Figure 1:
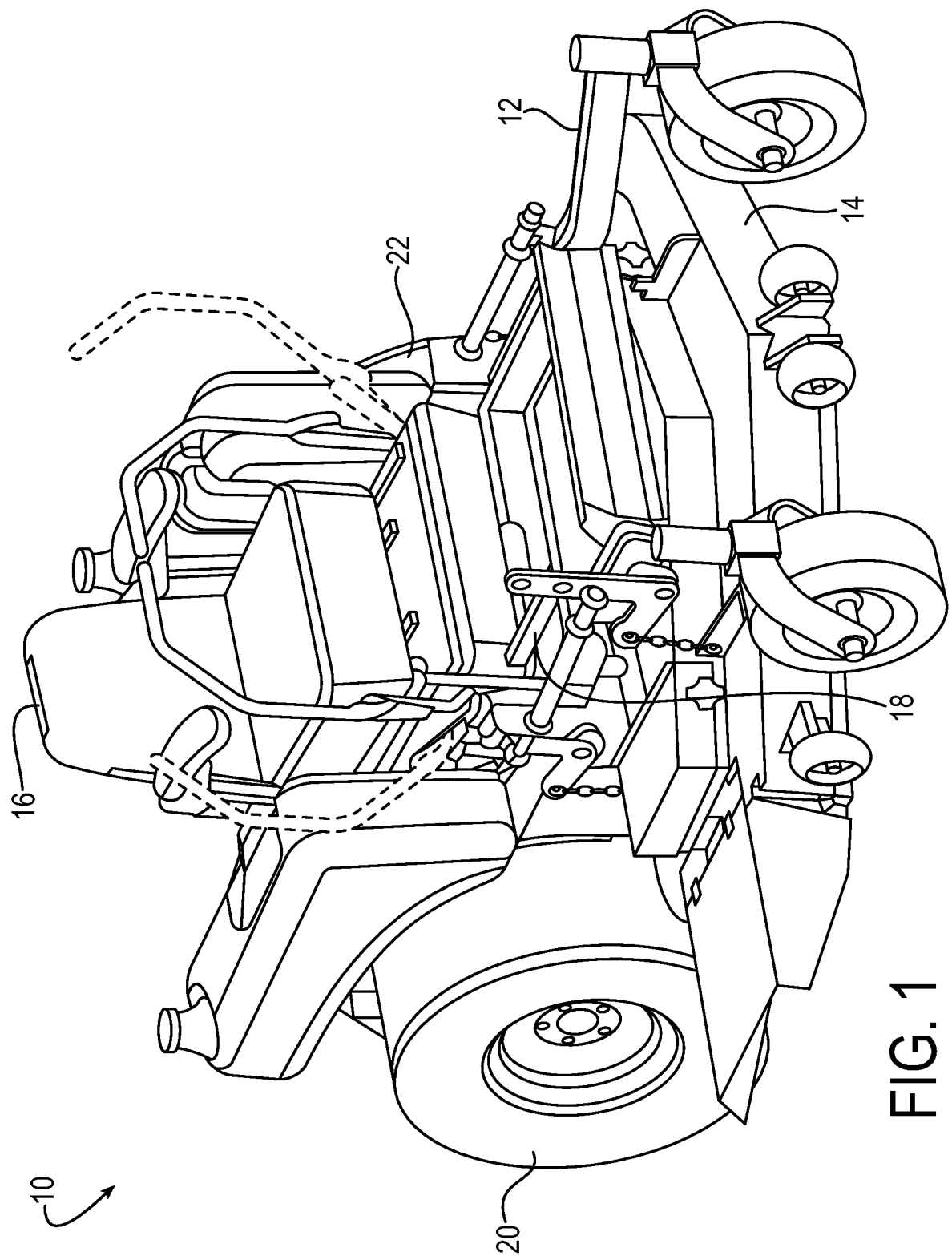
FIG. 1 is a perspective view of an exemplary zero-turn-radius mower.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 16, and a plurality of controls 18 for operating the mower 10. A rear mounted engine (not shown) mounted to the frame 12 behind the seat 16 provides power to a hydraulic axle combination mounted to the frame 12, the hydraulic axle combination including hydrostatic transmissions, such as a left-hand hydrostatic transmission 30 (FIG. 2) and a right-hand hydrostatic transmission (not shown). The hydrostatic transmissions can be controlled by an operator to independently drive respective rear wheels 20 and 22 to propel the mower and to provide zero-turn-radius functionality.

The plurality of controls 18 may include a brake actuator for operator-initiated actuating of a brake apparatus of at least one of the hydrostatic transmissions. The operator-actuated brake actuator may be mechanical, electric, hydraulic, magnetic, pneumatic, or any suitable combination thereof. Alternatively, in other embodiments the brake actuator may be omitted and the brake apparatus may be actuated automatically. The design of the illustrated mower 10 is merely exemplary in nature, and it will be appreciated that other mower designs, vehicle types or lawn equipment types can be used in accordance with the invention.

Figure 2:
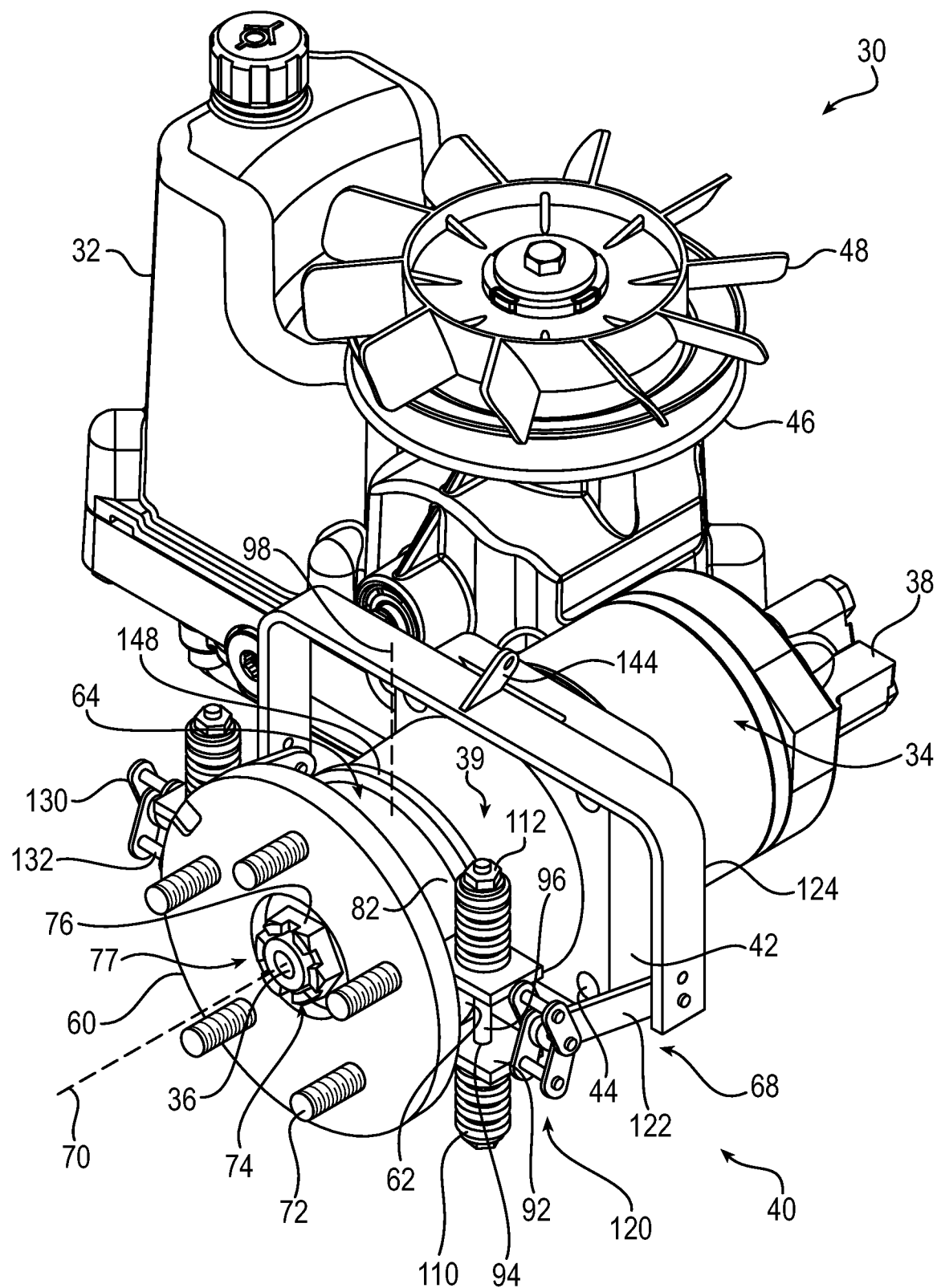
FIG. 2 is a front perspective view of a hydrostatic transmission including an exemplary brake apparatus according to the invention.
Figure 3:
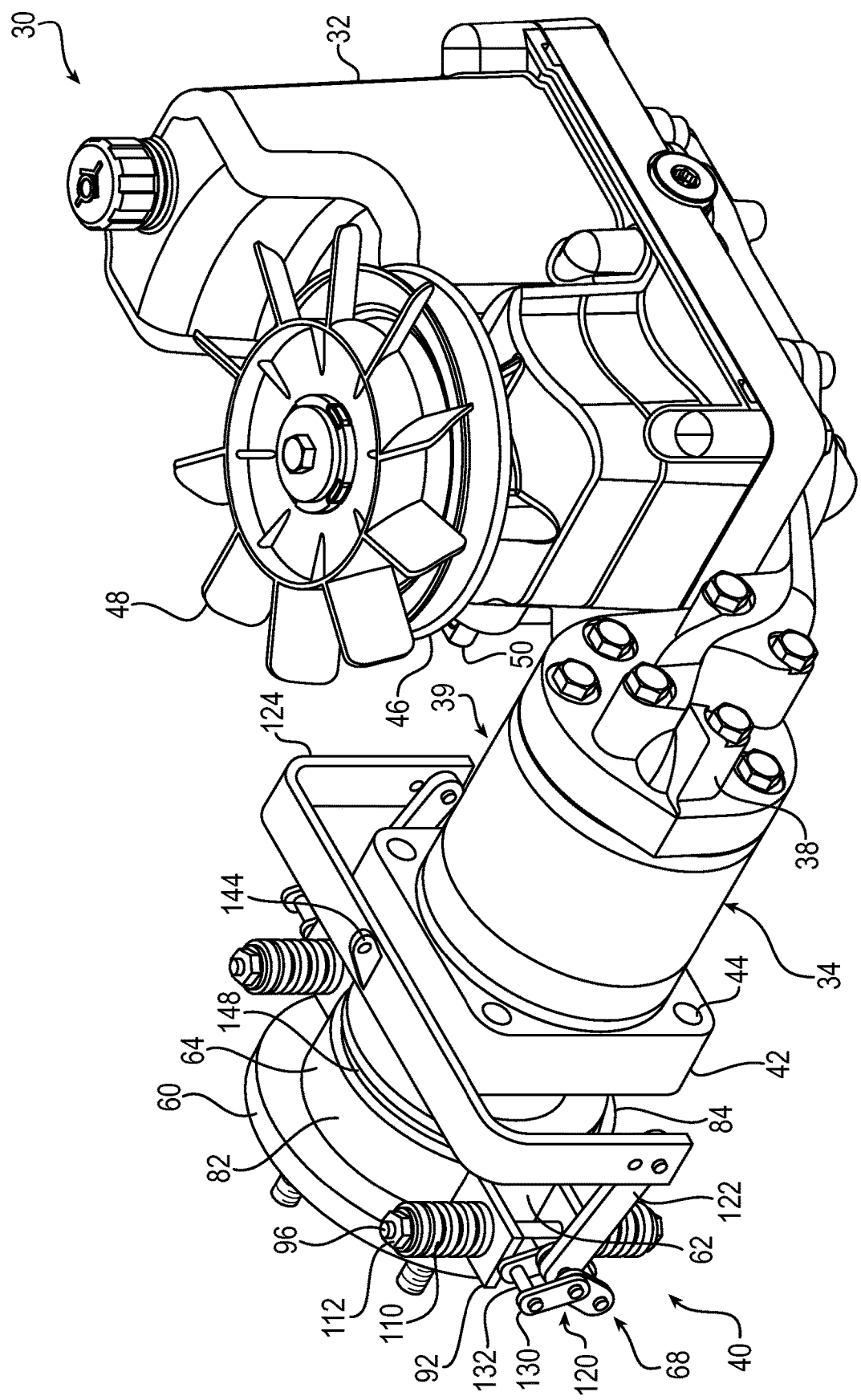
FIG. 3 is a rear perspective view of the hydrostatic transmission including the exemplary brake apparatus of FIG. 2.

Turning now to FIGS. 2 and 3, the transmission 30 includes a reservoir housing 32 that houses a hydraulic pump, a motive device such as a hydraulic motor 34 that includes an output shaft 36 that can act as an axle shaft or be coupled to an axle shaft, and a porting manifold 38 including a pump mount surface and a motor mount surface.

The hydraulic pump, which may be any suitable pump such as a variable displacement piston pump, has an input shaft projecting from the reservoir housing 32 to which an input wheel 46 and a cooling fan 48 may be attached, and a trunnion shaft 50 extending through the housing 32. The input wheel 46, as shown, may be a pulley about which a drive belt can be trained as is customary for driving a pump off of an engine. Alternatively, other types of drive wheels may be employed, such as a sprocket for use with a chain drive. It is noted, however, that pulley drives are more customary in the zero-turn-radius art.

The motor 34, which may be any suitable motor such as a low speed, high torque hydraulic motor, is provided with attachment lugs 42 having through holes 44 for receiving fasteners for mounting the motor 34, and more particularly the entire transmission 30, to the mower 10. As used herein, coupling may refer to direct or indirect coupling.

The output shaft 36 is supported in a shaft support 39 of the motor 34. The shaft support 39 may have any suitable bearings or bushings for enabling efficient rotation of the output shaft 36.

A brake apparatus 40 is provided for restricting and preferably preventing, rotation of the wheel 20 as described below. The brake apparatus 40 is actuated to transition the brake apparatus 40 from a braked state to a non-braked state, to permit rotation of the wheel 20. Thus, upon actuatable disengagement of the brake apparatus 40, the brake apparatus 40 is preferably configured to allow rotation of the wheel 20 or 22.

One or more brake apparatuses 40 may be included. The components of the brake apparatus 40 may be used for both left-side and right-side brakes. Preferably, the mowing machine 10 includes separately drivable wheels 20 and 22, each of which may be braked by a separate brake apparatus 40. And thus one of the wheels 20 or 22 may be braked while the other may still rotate.

It will be appreciated that the brake apparatus 40 may be configured to brake the wheel 20 or 22 by being coupled to any suitable rotatable member of a drive train driving the wheel 20 or 22. In the depicted embodiment, the brake apparatus 40 is coupled to the motor 34. The brake apparatus 40 is coupled to a rotatable member, such as the output shaft 36, which is in turn coupled to the wheel 20. Thus, upon actuatable engagement of the brake apparatus 40, the brake apparatus 40 is preferably configured to stop turning of the wheel 20.

In some embodiments, such rotatable member may not be the output shaft 36, and the rotatable member instead may be operably coupled to the output shaft 36, directly or indirectly via a gear train, friction wheel train, chain drive, or belt drive. In some embodiments, the brake apparatus 40 may be coupled to a non-powered rotatable member rather than to a driven rotatable member, such as the axle of a non-driven wheel of the vehicle.

In some embodiments, the brake apparatus 40 may be coupled to an alternative motive device for driving a wheel of a vehicle, such as an axial piston motive device. In the case of the mowing machine 10, a brake apparatus 40 may be coupled to and configured to brake the hydraulic pump. In such case the brake apparatus 40 may be coupled to any suitable rotatable member of the hydraulic pump.

It will be appreciated that the brake apparatus 40 in other embodiments may be configured to brake an alternative axial piston motive device, such as an axial piston motor or axial piston pump. The axial piston motive device braked by a brake apparatus 40 may be included in a vehicle, such as a mowing machine, such as for driving a wheel 20. In other embodiments, an axial piston motive device braked by a brake apparatus 40 may not be provided for driving a wheel, and/or the axial piston motive device may not be included in a vehicle.

Figures 4, 5:
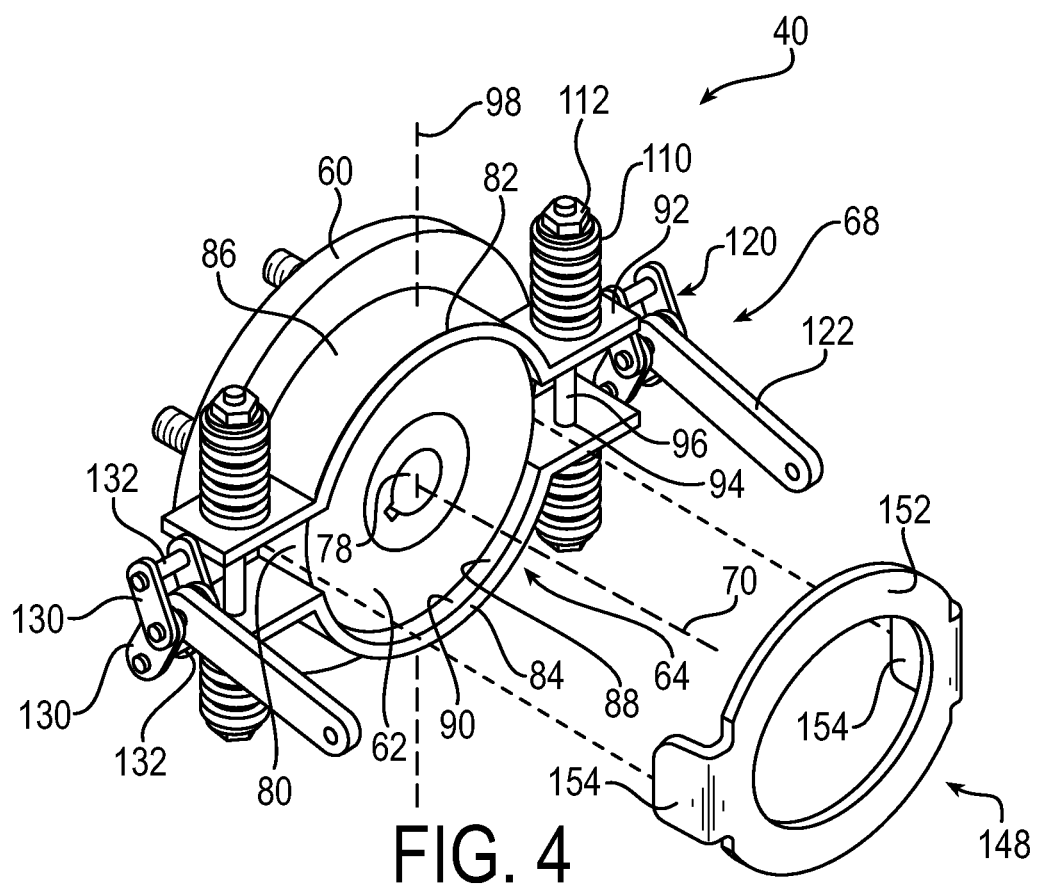
FIG. 4 is a perspective view of the exemplary brake apparatus of FIG. 2.
FIG. 5 is a partial enlarged view of an alternative linkage assembly for use with the brake apparatus of FIG. 2.

Referring next to FIGS. 2-4, the exemplary brake apparatus 40 will be discussed in detail. The brake apparatus 40 may include a hub 60 for mounting the respective wheel 20 (FIG. 1), and a brake member 62 mounted to the hub 60 for joint rotation therewith. The brake apparatus 40 also includes a gripping member 64 and a linkage assembly 68 that are jointly configured to assist in controlling rotation of the brake member 62.

Turning first to the hub 60, the hub 60 may be mounted by the brake member 62 in any suitable manner to the hub 60, such as via bolts, welding, slots and grooves, etc. The hub 60 is driven for rotation about a rotational axis 70 via the motor 34, thereby driving a wheel 20 also mounted to the hub 60, such as via threaded members 72 of the hub 60. As shown, the axis of rotation of the output shaft 36 is colinear with the rotational axis 70, also herein referred to as the axis of rotation 70.

In other embodiments, the hub 60 and the brake member 62 may be integral with one another. In even other embodiments, the axes of rotation of the output shaft 36 and the hub 60 may not be colinear. For example, these axes may be set at an angle relative to one another.

The hub 60 includes a through-hole 74 extending axially therethrough for receiving the output shaft 36 along the rotational axis 70. In the depicted embodiment, the output shaft 36 is coupled to each of the hub 60 and to the brake member 62 via any suitable manner, such as via welding, fasteners, spline connection, tapered end, etc. A fastener 76 is coupled to a distal end 77 of the output shaft 36, such as being threadedly coupled, thereby axially maintaining the hub 60 and brake member 62 along the rotational axis 70 between the fastener 76 and the shaft support 39.

In another embodiment, only the hub may be coupled to the output shaft 36, with the brake member 62 coupled indirectly to the output shaft 36 via its mounting to the hub 60.

The brake member 62, such as a brake disc or brake drum, for example, is fixable on the rotatable member, which in the illustrated embodiment is the output shaft 36. Thus the brake member 62 is operatively rotatable jointly with the output shaft 36 and the hub 60. The brake member 62 includes a through-hole 78 along the rotational axis 70 for receiving the output shaft 36. The through-hole 78 is slotted for receiving a tapered shaft connection of the output shaft 36, to allow for rotational fixing of the brake member 62 on the output shaft 36.

The brake member 62 is generally cylindrical, such as being disc-shaped, and has an arcuate, such as circular, radially outer surface 80 for being engaged by the gripping member 64. The gripping member 64 is configured for engaging and disengaging the radially outer surface 80 of the brake member 62 to restrict or permit rotation of the brake member 62, and thus of the output shaft 36 and the hub 60.

As depicted in FIGS. 2-4, the gripping member 64 includes opposing shoes 82 and 84 disposed about the radially outer external surface 80 of the brake member 62. The upper shoe 82 and the lower shoe 84 are configured to move, preferably to linearly translate, towards and away from one another, thereby respectively engaging and disengaging at least a partial circumferential extent of the brake member 62.

The shoes 82 and 84 have opposing arcuate portions 86 for frictionally engaging the corresponding arcuate radially outer surface 80 of the brake member 62. The arcuate portions 86 have on radially inwardly facing surfaces 88 one or more gripping elements 90 that are configured to cause friction between the gripping member 64 and the brake member 62. The gripping element 90 depicted may include a friction-causing material that lines or coats at least part of the surfaces 88 of each of the shoes 82 and 84.

In other embodiments, multiple gripping elements 90 of different materials or of different configurations may be included. In some embodiments, the gripping elements may include one or more projections, such as teeth, extending towards the radially outer surface 80 of the brake member 62 for engaging therewith. In even other embodiments, the outer surface 80 may include one or more similar gripping elements 90, and the arcuate portions may have the one or more gripping elements 90 or the elements 90 may be omitted from the gripping member 64.

Extending from the arcuate portions 86 of the shoes 82 and 84 are opposed outwardly extending ends 92. The ends 92 include through-holes 94, allowing the shoes 82 and 84 to be received onto guide members 96. Via this configuration, the shoes 82 and 84 are enabled to move along the guide members 96, such as to linearly translate along a translation axis 98 that is transverse the rotational axis 70 of the hub 60. In the depicted embodiment, the translation axis 98 is orthogonal to and intersects the rotational axis 70.

The gripping member 64 is biased into default engagement with the brake member 62 via one or more biasing members 110, to generate holding torque of the brake member 62 to restrict rotation of the brake member 62 in a normally engaged state. Four illustrated biasing members 110 are disposed on the guide members 96, each between a fastener 112 and a respective outwardly extending end 92 of the shoes 82 and 84. The biasing members 110 shown are compression springs, although other types of biasing members may be used where suitable.

It will be appreciated that in other embodiments, fewer or more biasing members may be used, different types of biasing members may be used, or the configuration of the ends 82, guide members 96 and biasing members 110 may be differently constructed as is suitable to engage the brake member 62.

The depicted biasing members 110 generate enough holding torque to restrict or altogether prevent rotation of the brake member 62. This enables the brake apparatus 40 to remain engaged in a normal state until caused to be disengaged. Depending on the type of biasing members 110 used, the holding torque may be sufficient for use when the motor 34 is driving the output shaft 36, or only when the output shaft 36 is not being driven, such as in a parking situation.

In connection with the gripping member 64, the linkage assembly 68 is configured to move the gripping member 64 to a secondary position at least partially spaced from the brake member 62 and from the default engaged position of the gripping member 64, to disengage the shoes 82 and 84 from the brake member 62, thereby allowing full rotation of the brake member 62. The linkage assembly 68 is configured to provide high mechanical advantage by providing a higher output force to disengage the gripping member 64 than is input to the linkage assembly 68, such as via the plurality of controls 18 (FIG. 1). For example, an output force from the linkage assembly may be greater than an input force to the linkage assembly 68 by a power of 1.5 or more, for example.

As illustrated, the linkage assembly 68 includes a pivoting linkage 120, a thrust link 122 and a bail 124 coupled to one another. The pivoting linkage 120 is coupled to the gripping member 64, the thrust link 122 is coupled between the pivoting linkage 120 and the bail 124, and the bail 124 is configured for being coupled to the plurality of controls 18 (FIG. 1) of the mowing machine 10 (FIG. 1), such as by a non-shown actuation connector. Thus, as shown, the brake apparatus 40 may be described as having a floating pin linkage.

The linkage assembly 68 includes two pivoting linkages 120, disposed on opposing lateral sides of the gripping member 64. Each pivoting linkage 120 is coupled to, such as between, opposing outwardly extending ends 92 at one lateral side of the gripping member 64.

The pivoting linkage 120, and by virtue the linkage assembly 68, is a force amplifying linkage that is configured to convert a first input force to the pivoting linkage 120 into a greater output force at the pivoting linkage, thereby moving the ends 92. The pivoting linkage 120 enables the brake apparatus 40 to remain in a disengaged state, corresponding to disengagement of the gripping member 64 from the brake member 62, until acted upon by an actuation mechanism, such as a control of the plurality of controls 18 (FIG. 1) for actuating the brake apparatus 40.

For example, the maintaining of the disengaged state and the amplification of the input force is enabled via the construction of the pivoting linkage 120, which is shown as a three-pin linkage. The links 130 of the three-pin linkage may be coupled to one another and to the ends 92 via fasteners 132, such as pins, bolts, or any other suitable fastener allowing rotation of the links. During each of the engaged and disengaged states of the brake apparatus 40, the two links 130 will be disposed at an angle relative to one another, after having moved through an intermediate position where the links 130 are linearly aligned. Accordingly, the links 130 will not move from one angularly-displaced position, through the linearly aligned position, and to the opposing angularly-displaced position absent an input force to the pivoting linkage 120 via the thrust link 122. In this way, the biasing force of the biasing members 110 is not configured to be sufficient alone to move the brake apparatus 40 out of the disengaged state.

The opposing thrust links 122 are disposed at opposite lateral sides of the gripping member 64. The thrust links 122 are each illustrated as a rigid bar coupled between a respective pivoting linkage 120 and the bail 124, though alternative constructions may be suitable. The thrust links 122 allow for transfer of an input force at the linkage assembly 68 to the pivoting linkages 120. Thus, movement of the thrust links 122 cause the gripping member 64 to engage or disengage the radially outer surface 80 of the brake member 62. Further, because the brake apparatus 40 is normally engaged, movement of the thrust links 122 from a default position when the brake apparatus 40 is normally engaged, effects disengagement of the gripping member 64 from the brake member 62.

The bail 124 is depicted as a U-bracket, shaped to couple to each of the thrust links 122. At a location between lateral sides of the bail 124, such as at a middle of the U-bracket shape, an attachment lug 144 is provided for coupling to the plurality of controls 18 (FIG. 1).

In some embodiments, the bail 124 may be omitted. In some embodiments, it will be appreciated that only one thrust ink 122 may be used.

Referring now in brief only to FIG. 4, the holding torque at the normally engaged state of the brake apparatus 40, which is caused by the engagement of the gripping member 64 with the brake member 62, is reacted through an anti-rotation member 148 that is suitably coupled to the motor housing of the motor 34. The anti-rotation member 148 restricts or altogether prevents rotation of the gripping member 64 with the brake member 62. The anti-rotation member 148 is configured to interlock with the gripping member 64, such that the gripping member 64 in default engagement with the brake member 62 is restricted from rotation with the brake member 62.

The anti-rotation member 148 is fixable relative to each of the brake member 62 and the gripping member 64, such as being fixed to the shaft support 39 of the motor 34. The fixing may be by bolts, welding, etc. The anti-rotation member 148 includes a center portion 152 and opposing projections 154 extending from the center portion 152, such as in an axial direction along the axis of rotation 70.

Each projection 154 is disposed between the ends 92 of the gripping member 64. Each projection 154 is shaped, such as having a height between the ends 92, to allow for engagement of the gripping member 64 with the brake member 62, while also restricting rotation of the gripping member 64 about the output shaft 36.

It will be appreciated that in some embodiments, a projection 154 may be disposed about each pair of ends 92, rather than between the pair of ends. In other embodiments, one of the depicted projections 154 may be omitted.

Turning briefly to FIG. 5, another exemplary embodiment of a linkage assembly for use with the brake apparatus 40 is shown as 168. The alternative linkage assembly 168 includes an alternative pivoting linkage 220 that is a cam linkage, and a thrust link 222 coupled thereto. A cam link 230 of the alternative pivoting linkage 220 is coupled between respective ends 92 of the gripping member 64 via fasteners 232, such as pins. The cam link 230 includes a slot 233 for enabling movement of one end of the cam link 230 along a first fastener 232 while an opposite end of the cam link 230 pivots about a second fastener 232.

It will be appreciated that alternative constructions of the cam link and of the alternative pivoting linkage may be suitable.

Figure 6:
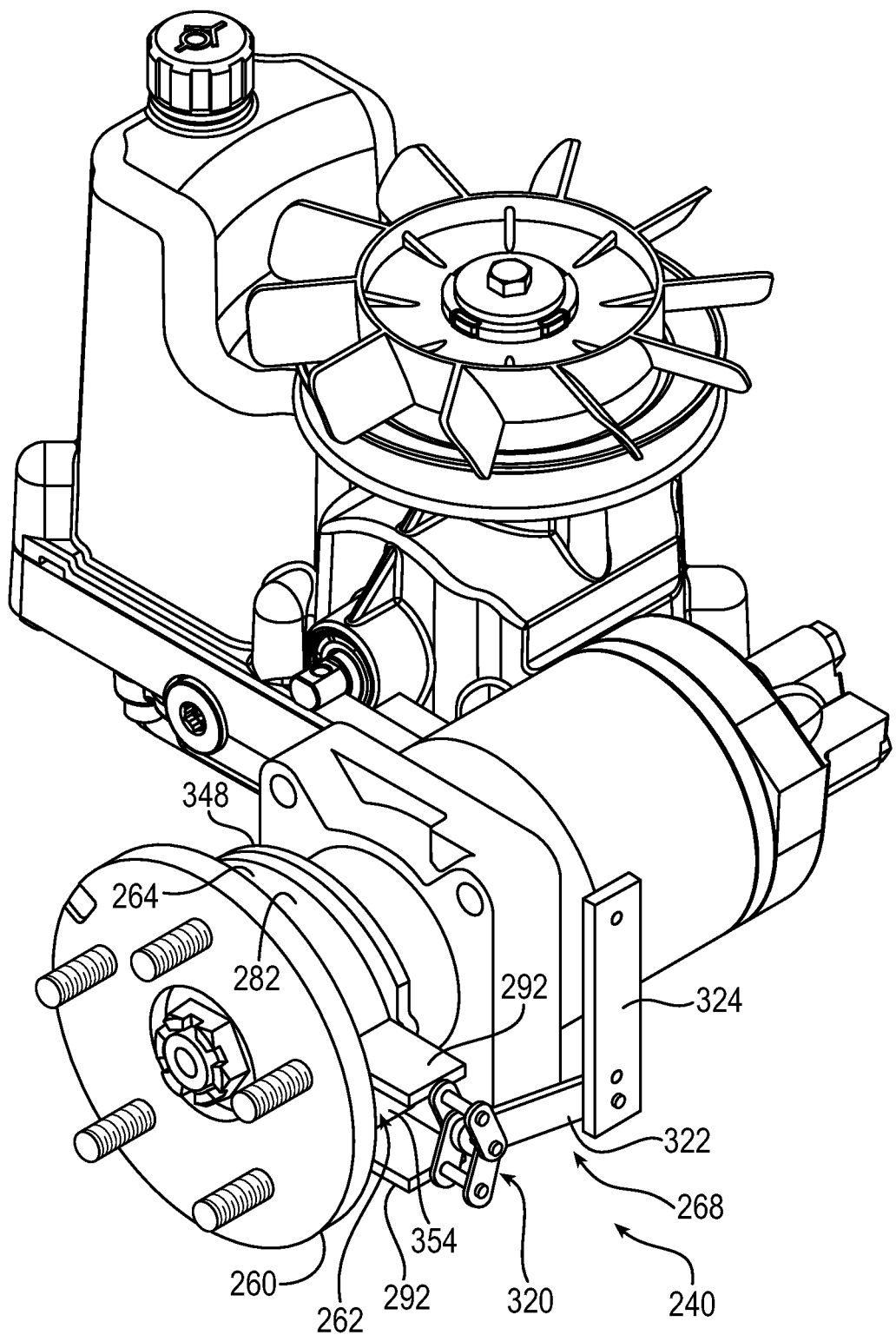
FIG. 6 is a front perspective view of another hydrostatic transmission including an exemplary brake apparatus according to the invention.
Figure 7:
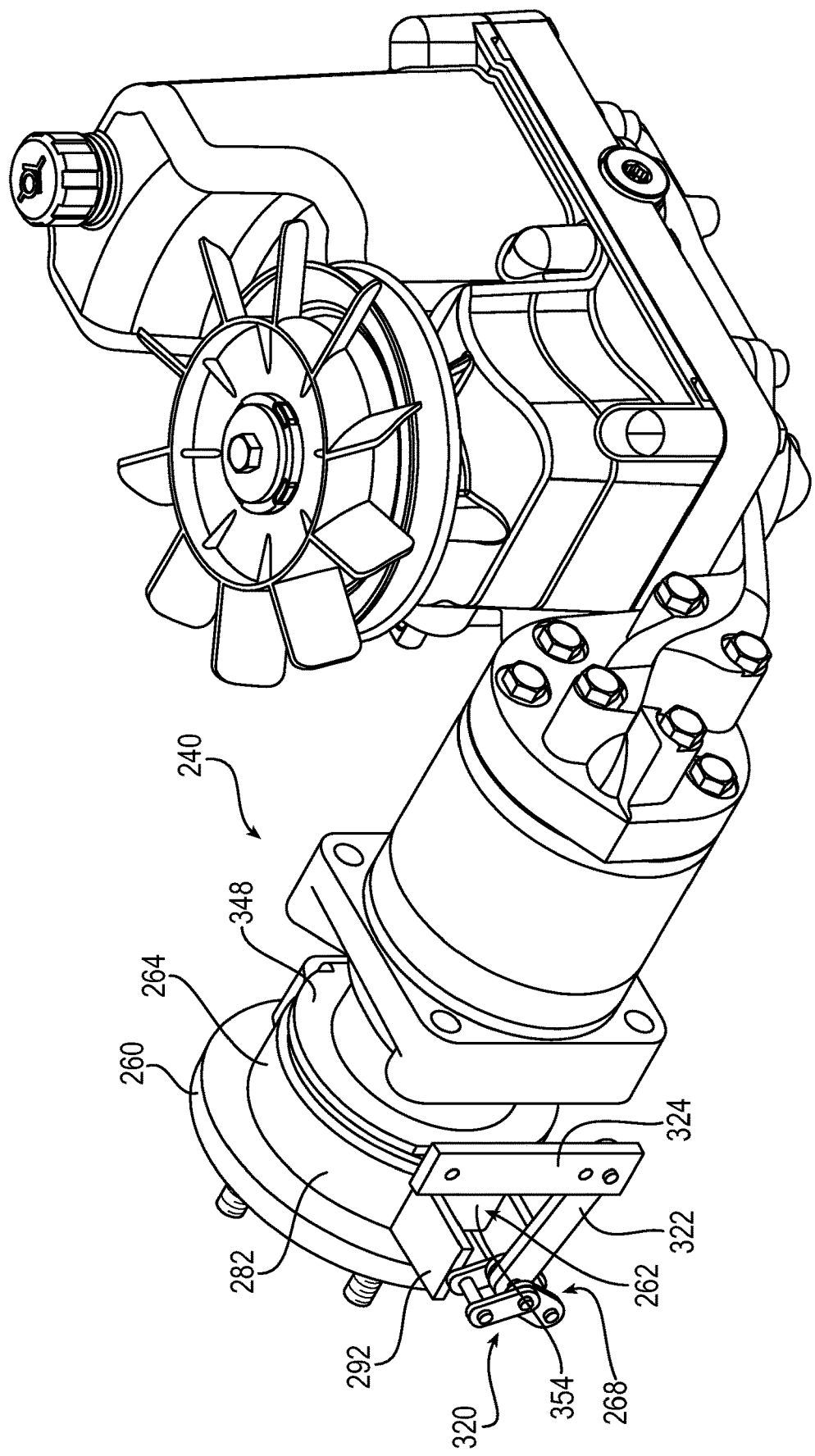
FIG. 7 is a rear perspective view of the hydrostatic transmission including the exemplary brake apparatus of FIG. 6.
Figure 8:
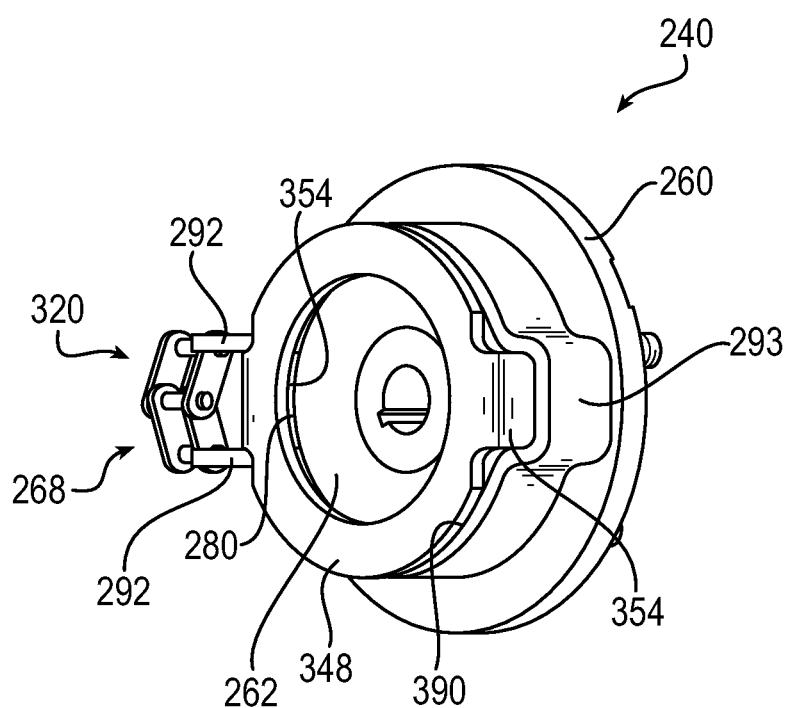
FIG. 8 is a perspective view of the exemplary brake apparatus of FIG. 6.

Turning now to FIGS. 6-8, another exemplary embodiment of the brake apparatus in accordance with the invention is shown at 240. The brake apparatus 240 is substantially the same as the above-referenced brake apparatus 40, and consequently the same reference numerals but indexed by 200 are used to denote structures of the brake apparatus 240 corresponding to similar structures in the brake apparatus 40. In addition, the foregoing description of the brake apparatus 40 is equally applicable to the brake apparatus 240 except as noted below. Moreover, it will be appreciated upon reading and understanding the specification that aspects of the brake apparatuses 40 and 240 may be substituted for one another or used in conjunction with one another where suitable.

The brake apparatus 240 may be used with the transmission 30 of the mowing machine 10 of FIG. 1, or with any equipment requiring restriction of rotation of a component. The brake apparatus 240 includes a hub 260, brake member 262, gripping member 264, linkage assembly 268, and anti-rotation member 348.

The gripping member 264 includes a single shoe 282 that is disposed about a circumferential extent of the brake member 262, such as circumscribing a majority of the outer circumferential extent of the brake member 262. The shoe 282 has a pair of outwardly extending ends 292 for coupling to the linkage assembly 268. Laterally opposite the pair of ends 292 is a pivoting portion 293 shaped to receive a projection 354 of the anti-rotation member 348. An opposing projection 354 may be disposed between the pair of ends 292.

In some embodiments, the pivoting portion 293 may be omitted. As used herein, a majority refers to greater than 50%.

The shoe 282 includes an elastic band disposed about the brake member 262 and biased in a normal state of engagement with the radially outer surface 280 of the brake member 262. For example, the elastic band may be a metallic band that is diametrically undersized with respect to the diametrical extent of the brake member 262, such that when in the normal state, the elastic band provides the necessary holding torque for restricting or preventing rotation of the brake member 262. The metal material of the elastic band may be such that it acts as its own biasing element. Like the shoes 82 and 84, a friction-causing element 390 may be included on a surface of the shoe 282 engaging the brake member 262.

The linkage assembly 268 includes a single pivoting linkage 320, a single thrust link 322 and a bail 324. The pivoting linkage 320 is coupled to, such as between, the pair of outwardly extending ends 292 of the shoe 282. The pivoting linkage 320 is illustrated as a force amplifying three-pin linkage, though may be a cam linkage in other embodiments.

Figure 9:
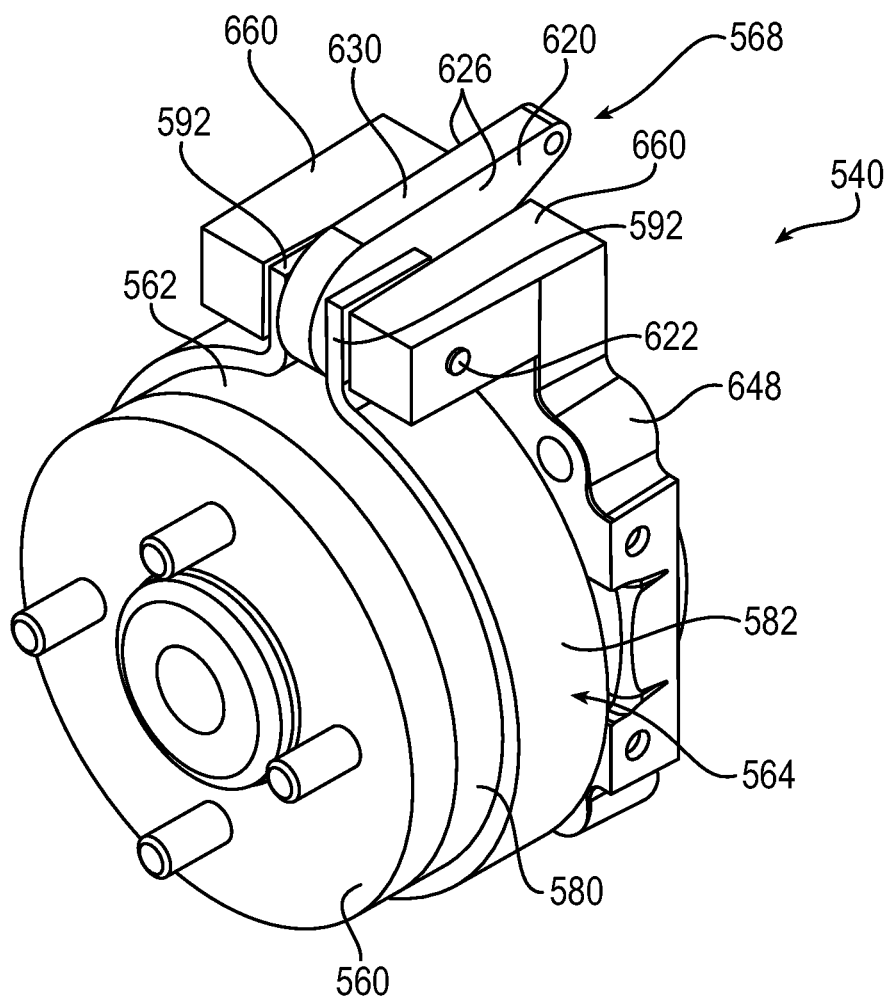
FIG. 9 is a perspective view of yet another exemplary brake apparatus according to the invention.
Figure 10:
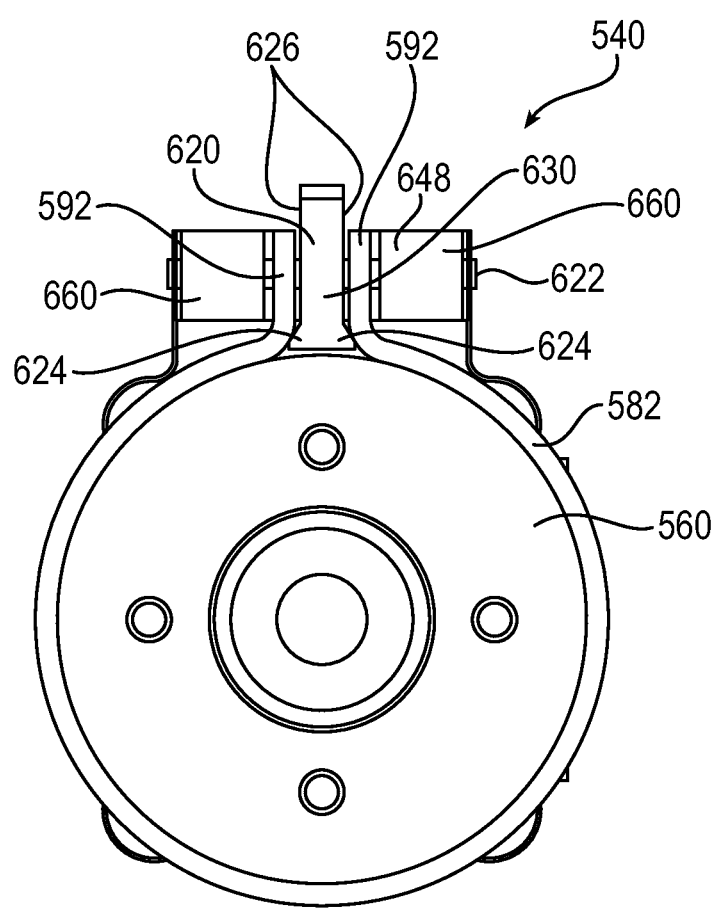
FIG. 10 is a front view of the brake apparatus of FIG. 9.

Turning now to FIGS. 9 and 10, yet another exemplary embodiment of the brake apparatus in accordance with the invention is shown at 540. The brake apparatus 540 is substantially the same as the above-referenced brake apparatus 40, and consequently the same reference numerals but indexed by 500 are used to denote structures of the brake apparatus 540 corresponding to similar structures in the brake apparatus 40. In addition, the foregoing description of the brake apparatus 40 is equally applicable to the brake apparatus 540 except as noted below. Moreover, it will be appreciated upon reading and understanding the specification that aspects of the brake apparatuses 40 and 540 may be substituted for one another or used in conjunction with one another where suitable.

The brake apparatus 540 may be used with the transmission 30 of the mowing machine 10 of FIG. 1, or with any equipment requiring restriction of rotation of a component. The brake apparatus 540 includes a hub 560, brake member 562, gripping member 564, linkage assembly 568, and anti-rotation member 648.

The gripping member 564 includes a single shoe 582 that is disposed about a circumferential extent of the brake member 562, such as circumscribing a majority of the outer circumferential extent of the brake member 562. The shoe 582 has a pair of outwardly extending ends 592 for coupling to the linkage assembly 568 and to the anti-rotation member 648.

The shoe 582 includes an elastic band disposed about the brake member 562 and biased in a normal state of engagement with the radially outer surface 580 of the brake member 562. For example, the elastic band may be a metallic band that is diametrically undersized with respect to the diametrical extent of the brake member 562, such that when in the normal state, the elastic band provides the necessary holding torque for restricting or preventing rotation of the brake member 562. The metal material of the elastic band may be such that it acts as its own biasing element. Like the shoes 82 and 84 (FIG. 4), a friction-causing element (not shown) may be included on a surface of the shoe 582 engaging the brake member 562.

The linkage assembly 568 includes a single pivoting linkage 620 connected between the ends 592, such as via a pin 622, as depicted. The pivoting linkage 620 includes opposed outwardly projecting ridges 624 extending from opposed sides 626 of the pivoting linkage 620. The ridges 624 are gradually tapered towards the contour of the remainder of the body 630 of the pivoting linkage 620. The ridges 624 are not disposed between the ends 592 of the shoe 582 in the normal state of engagement of the shoe 582 with the brake member 562. Upon pivoting of the pivoting linkage 620, the ridges 624 are moved, such as being cammed, into engagement between the ends 592 of the shoe 582, thus spreading apart the ends 592. In this secondary state, the brake member 562 is released substantially or fully from braking and is enabled to rotate.

As will be appreciated, one or more ridges 624 of any suitable shape may be included. Opposing ridges 624 may not be used. Rather, a ridge 624 may extend from only one side 626 of the pivoting linkage 620 in some embodiments.

The pivoting linkage 620 is also pinned between projections 660 of the anti-rotation member 648, with each of the ends 592 and pivoting linkage 620 being disposed between opposed projection 660. The pin 622 extends through each of the projections 660, each of the ends 592, and the pivoting linkage 620. The anti-rotation member 648 is configured for being fixed to a portion of the respective motor, such as to a respective shaft support, such as the shaft support 39 of FIG. 1. Thus, as shown, the brake apparatus 540 may be described as having a fixed pin linkage.

Figure 11:
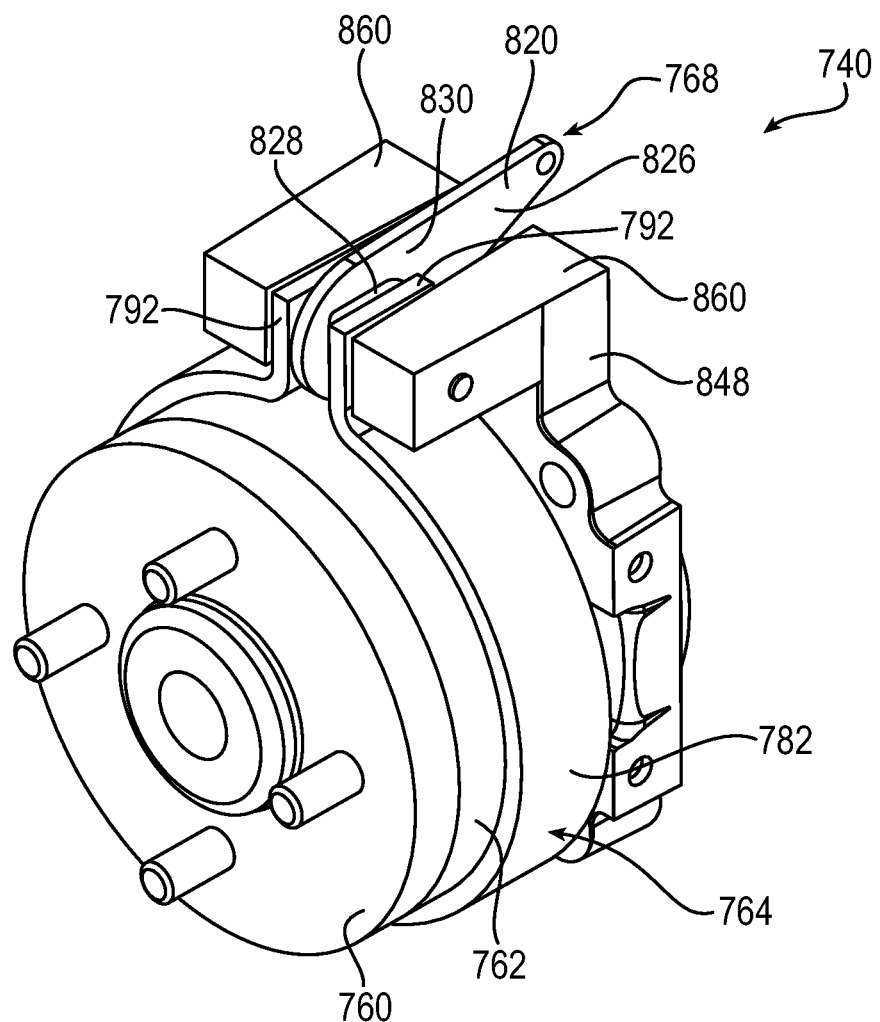
FIG. 11 is a perspective view of still another exemplary brake apparatus according to the invention.
Figure 12:
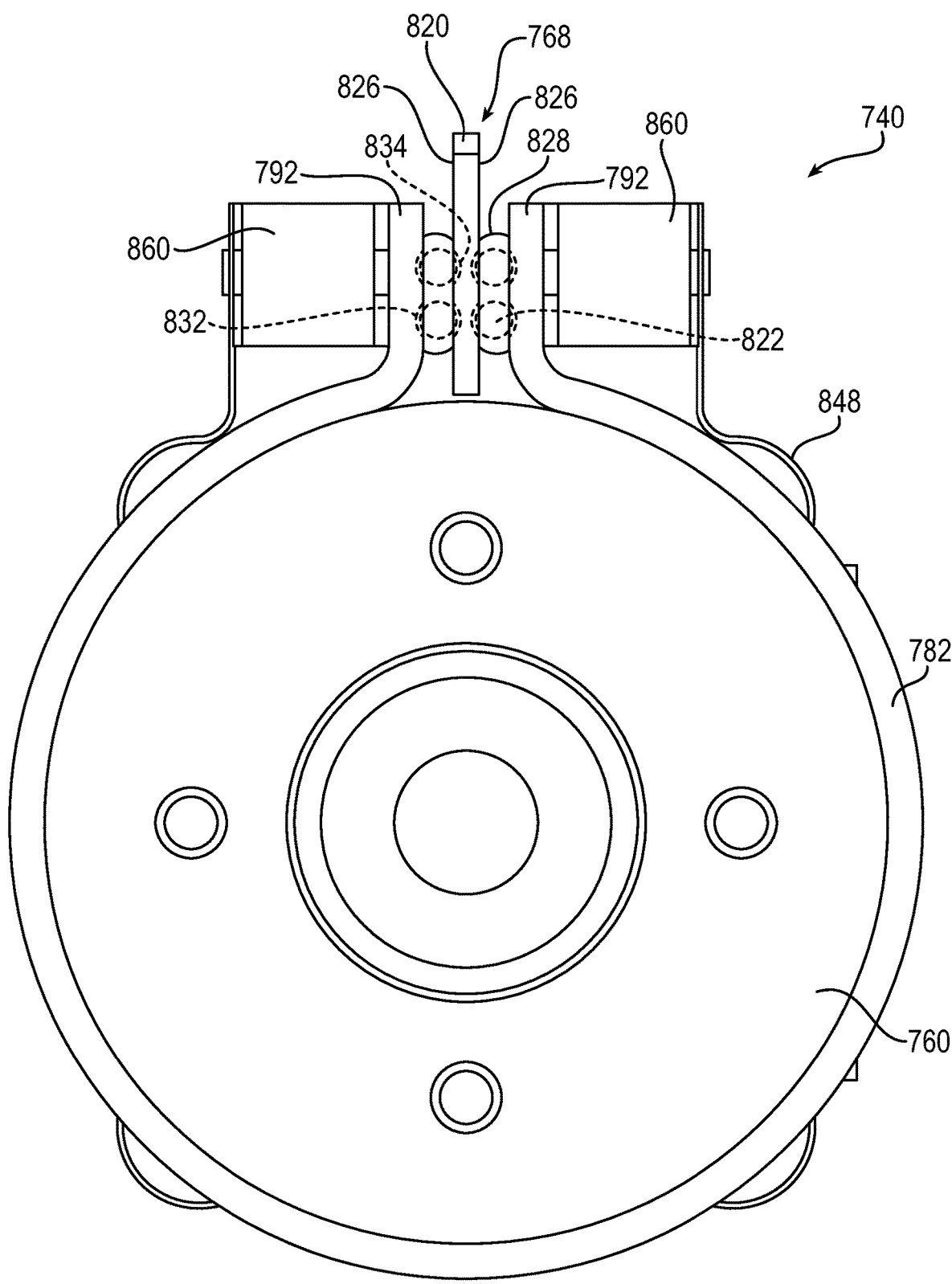
FIG. 12 is a front view of the brake apparatus of FIG. 9.

Turning next to FIGS. 11 and 12, still another exemplary embodiment of the brake apparatus in accordance with the invention is shown at 740. The brake apparatus 740 is substantially the same as the above-referenced brake apparatus 40, and consequently the same reference numerals but indexed by 700 are used to denote structures of the brake apparatus 740 corresponding to similar structures in the brake apparatus 40. In addition, the foregoing description of the brake apparatus 40 is equally applicable to the brake apparatus 740 except as noted below. Moreover, it will be appreciated upon reading and understanding the specification that aspects of the brake apparatuses 40 and 740 may be substituted for one another or used in conjunction with one another where suitable.

The brake apparatus 740 may be used with the transmission 30 of the mowing machine 10 of FIG. 1, or with any equipment requiring restriction of rotation of a component. The brake apparatus 740 includes a hub 760, brake member 762, gripping member 764 that includes a shoe 782, linkage assembly 768 with a pivoting linkage 820, and anti-rotation member 848 including opposed projections 860.

Similar to the shoe 582 of FIGS. 9 and 10, the single shoe 782 is disposed about a circumferential extent of the brake member 762, such as circumscribing a majority of the outer circumferential extent of the brake member 762. The shoe 782 has a pair of outwardly extending ends 792 for coupling to the linkage assembly 768 and to the anti-rotation member 848.

Moreover, the brake apparatus 740 is substantially similar to the brake apparatus 540 of FIGS. 9 and 10, with exception of the pivoting linkage 820. The pivoting linkage 820 includes bearing members 822, such as ball bearings as depicted, or roller bearings. The bearing members 822 are retained against opposed sides 826 of the pivoting linkage 820 via cage members 828. The cage members may be connected in any suitable manner to the sides 826 of the pivoting linkage 820. The cage members 828 and the bearing members 822 are disposed between a main body portion 830 of the pivoting linkage 820 and the ends 792 of the shoe 782.

The pivoting linkage 820 may include one or more linkage recesses 832 at one or both of the opposed sides 826 for receiving one or more of the bearing members 822. In other embodiments, the linkage recesses 832 may be omitted.

The ends 792 each include recesses 834 shaped to receive the bearing members 822. As shown, each recess 834 is shaped to receive a single bearing member 822, but the recesses 834 may be shaped to receive more than one bearing member 822 in other embodiments. The recesses 834 extend at least partially into a surface of each of the ends 792 facing the opposing sides 826 of the pivoting linkage 820.

When the brake apparatus 740 is in a normal state of engagement, the bearing members 822 are received in the recesses 834. Upon pivoting of the pivoting linkage 820, the bearing members 822 are moved out of the recesses 834, thus spreading apart the ends 792. In this secondary state, the brake member 762 is released substantially or fully from braking and is enabled to rotate.

As will be appreciated, one or more bearing members 822 of any suitable shape may be included. Opposing bearing members 822 may not be used. In some embodiments, the cage and bearing members may be attached to the ends 792, rather than to the pivoting linkage 820.

In summary, provided is a brake apparatus 40, 240, 540, 740 for restricting rotation of a rotatable member of a mowing machine 10, thereby controlling rotation of a wheel 20 of the mowing machine 10. The brake apparatus 40, 240, 540, 740 includes a brake member 62, 262, 562, 762 fixable on the rotatable member, and a gripping member 64, 264, 564, 764 for engaging and disengaging the brake member 62, 262, 562, 762 for restricting or permitting rotation of the rotatable member. A thrust link 122, 322 is coupled to the gripping member 64, 264, 564, 764 such that movement of the thrust link 122, 322 causes the gripping member 64, 264, 564, 764 to engage or disengage a radially outer surface 80, 280, 580 of the brake member 62, 262, 562, 762. For example, the gripping member 64, 264, 564, 764 may be biasedly engaged with at least a partial circumferential extent of the brake member 62, 262, 562, 762 such that actuation of the thrust link 122, 322 causes disengagement of the gripping member 64, 264, 564, 764 from the brake member 62, 262, 562, 762.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission comprising:
   a hydraulic pump;
   a hydraulic motor in fluid communication with the hydraulic pump, the hydraulic motor having an output shaft;
   a rotatable member including a wheel hub for mounting a wheel, the rotatable member being operatively coupled to the output shaft for rotation about a rotational axis; and
   a brake apparatus for restricting rotation of a rotatable member about the rotational axis, the brake apparatus comprising:
   a brake member fixable on the rotatable member; and
   a gripping member disposed about an external surface of the brake member and biased into default engagement with the brake member to restrict rotation of the rotatable member, wherein the gripping member is configured to be moved to a secondary position at least partially spaced from the brake member to allow rotation of the rotatable member; and
   a pivoting linkage operatively coupled to the gripping member;
   wherein the pivoting linkage is pivotable about a pivot axis that is transverse to the rotational axis of the brake member and the rotatable member; and
   wherein, movement of the pivoting linkage about the pivot axis causes the gripping member to engage or disengage a radially outer surface of the brake member.

2. The hydrostatic transmission of claim 1, further including an anti-rotation member fixable relative to the brake member and interlocking with the gripping member to restrict the gripping member from rotating with the brake member.

3. The hydrostatic transmission of claim 1,
   wherein the gripping member includes outwardly extending ends, and wherein the brake apparatus further includes a thrust link,
   wherein the pivoting linkage is coupled between the outwardly extending ends and to the thrust link, and
   wherein movement of the thrust link from a default position of the thrust link causes the pivoting linkage to pivot, thereby moving the ends relative to one another.

4. The hydrostatic transmission of claim 3, wherein the pivoting linkage is a force amplifying linkage configured to convert an input force at the thrust link into a greater output force at the amplifying linkage moving the ends.

5. The hydrostatic transmission of claim 3, wherein each of the outwardly extending ends of the gripping member have an opening; and wherein a guide member extends through the opening in each of the outwardly extending ends in a translation direction that is transverse to the rotational axis, the guide member being configured to guide the ends linearly towards and away from one another along the translation direction to thereby effect engagement with and disengagement from the brake member.

6. The hydrostatic transmission of claim 5, wherein the guide member includes at least one fastener on at least one end portion of the guide member; and wherein the brake apparatus includes at least one spring disposed on the guide member, the at least one spring being interposed between the at least one fastener and at least one of the outwardly extending ends of the gripping member.

7. The hydrostatic transmission claim 1, wherein the gripping member includes a single shoe circumscribing a majority of an outer circumferential extent of the brake member.

8. The hydrostatic transmission of claim 1, wherein the gripping member includes opposing shoes disposed about the brake member, the shoes being linearly translatable towards and away from one another to effect engagement with and disengagement from the brake member.

9. The hydrostatic transmission of claim 1, wherein the gripping member includes an elastic band disposed about the brake member, the elastic band being biased in a state of engagement with the brake member, and wherein movement of the pivoting linkage effects disengagement of the elastic band from the brake member.

10. The hydrostatic transmission of claim 1, wherein the gripping member has on a surface engageable with the brake member one or more gripping elements configured to cause friction between the gripping member and the brake member.

11. The hydrostatic transmission of claim 1, wherein the gripping member includes first and second shoes that are discrete with respect to each other, the first and second shoes being disposed on opposite sides the brake member;

wherein each of the first and second shoes includes an arcuate surface, and each includes first and second radially outwardly extending end portions on opposite sides of the arcuate surface, wherein the respective first outwardly extending end portions of the first and second shoes oppose each other, and the respective second outwardly extending end portions of the first and second shoes oppose each other; and wherein the first and second shoes are linearly translatable towards and away from one another to effect engagement with and disengagement from the brake member.

12. The hydrostatic transmission of claim 11, further including an anti-rotation member fixable relative to each of the brake member and the gripping member, the anti-rotation member having first and second axially extending protrusions that extend in a direction parallel to the rotational axis, wherein the first axially extending protrusion of the anti-rotation member is configured to interlock between the respective first radially outwardly extending end portions of the first and second shoes, and wherein the second axially extending protrusion of the anti-rotation member is configured to interlock between the respective second radially outwardly extending end portions of the first and second shoes, such that the gripping member in engagement with the brake member is restricted from rotation with the brake member.

13. A hydrostatic transmission comprising:

a hydraulic pump;

a hydraulic motor in fluid communication with the hydraulic pump, the hydraulic motor having an output shaft;

a rotatable member including a wheel hub for mounting a wheel, the rotatable member being operatively coupled to the output shaft for rotation about a rotational axis; and a brake apparatus for restricting rotation of a rotatable member about the rotational axis, the brake apparatus comprising:

a brake member fixable on the rotatable member; and a gripping member disposed about an external surface of the brake member and biased into default engagement with the brake member to restrict rotation of the rotatable member, wherein the gripping member is configured to be moved to a secondary position at least partially spaced from the brake member to allow rotation of the rotatable member, and wherein the gripping member includes outwardly extending ends, and wherein the brake apparatus further includes a force amplifying linkage configured to convert an input force to the force amplifying linkage into a greater output force at the amplifying linkage moving the ends.

14. The hydrostatic transmission of claim 13, further including an anti-rotation member configured to interlock with the gripping member such that the gripping member in default engagement with the brake member is restricted from rotation with the brake member, the anti-rotation member being fixable relative to each of the brake member and the gripping member.

15. The hydrostatic transmission of claim 13, wherein the gripping member includes opposing shoes disposed about the brake member, the shoes being linearly translatable towards and away from one another to effect engagement with and disengagement from the brake member.

16. The hydrostatic transmission of claim 13, wherein the force amplifying linkage is a linkage assembly operatively coupled to the gripping member;

wherein the linkage assembly is pivotable about a pivot axis that is transverse to the rotational axis of the brake member and the rotatable member; and wherein, movement of the linkage assembly about the pivot axis causes the gripping member to engage or disengage a radially outer surface of the brake member.

17. The hydrostatic transmission of claim 16, wherein the linkage assembly includes a thrust link and a pivoting linkage, the pivoting linkage being coupled to the gripping member and to the thrust link, and wherein movement of the thrust link from a default position of the thrust link causes the pivoting linkage to pivot about the pivot axis, thereby moving the outwardly extending ends of the gripping member relative to one another.

18. The hydrostatic transmission of claim 13, wherein the gripping member includes a shoe, the shoe being linearly translatable towards and away from the brake member to effect engagement with and disengagement from the brake member.

19. The hydrostatic transmission of claim 13, wherein the gripping member includes a band disposed about the brake member, the band being biased in a state of engagement with the brake member, and wherein movement of the force amplifying linkage from a default position effects disengagement of the band from the brake member.

20. A brake apparatus for restricting rotation of a rotatable member, the brake apparatus comprising:
a brake member fixable on the rotatable member for co-rotation therewith about a rotational axis;
a gripping member configured to engage and disengage the brake member for restricting or permitting rotation of the rotatable member;
a thrust link operatively coupled to the gripping member;
wherein the thrust link is pivotable about a pivot axis that is transverse to the rotational axis of the brake member and the rotatable member; and
wherein, movement of the thrust link about the pivot axis causes the gripping member to engage or disengage a radially outer surface of the brake member;
wherein the gripping member includes first and second shoes that are discrete with respect to each other, the first and second shoes being disposed on opposite sides the brake member;
wherein each of the first and second shoes includes an arcuate surface, and each includes first and second radially outwardly extending end portions on opposite sides of the arcuate surface, wherein the respective first outwardly extending end portions of the first and second shoes oppose each other, and the respective second outwardly extending end portions of the first and second shoes oppose each other; and
wherein the first and second shoes are linearly translatable towards and away from one another to effect engagement with and disengagement from the brake member;
wherein the thrust link is a first thrust link, the brake apparatus further comprising: a first pivoting linkage coupled to the first thrust link; a second thrust link; and a second pivoting linkage coupled to the second thrust link;
wherein the first pivoting linkage is coupled between the respective first radially outwardly extending end portions of the first and second shoes; and wherein the second pivoting linkage is coupled between the respective second radially outwardly extending end portions of the first and second shoes; and
wherein movement of the first and second thrust links causes the first and second pivoting linkages to pivot, thereby linearly moving the first and second shoes towards and away from one another to effect engagement with and disengagement from the brake member.

* * * * *